(12) United States Patent
Tzoreff

(10) Patent No.: US 8,500,134 B2
(45) Date of Patent: *Aug. 6, 2013

(54) TOY VEHICLE CONVERTIBLE BETWEEN TWO USE CONFIGURATIONS

(76) Inventor: Mishael Tzoreff, Milan (IT)

(*) Notice: Subject to any disclaimer, the term of this patent is extended or adjusted under 35 U.S.C. 154(b) by 322 days.

This patent is subject to a terminal disclaimer.

(21) Appl. No.: 12/811,436

(22) PCT Filed: Jan. 15, 2009

(86) PCT No.: PCT/IT2009/000013
§ 371 (c)(1),
(2), (4) Date: Jul. 1, 2010

(87) PCT Pub. No.: WO2009/090683
PCT Pub. Date: Jul. 23, 2009

(65) Prior Publication Data
US 2010/0283220 A1    Nov. 11, 2010

(30) Foreign Application Priority Data

Jan. 18, 2008  (IT) .............................. MI2008A0070

(51) Int. Cl.
*B62K 9/02* (2006.01)
(52) U.S. Cl.
CPC ...................................... *B62K 9/02* (2013.01)
USPC ............................................ 280/7.1; 280/282
(58) Field of Classification Search
CPC ........................................................ B62K 9/02
USPC ..................... 29/401.1; 280/281.1, 282, 7.1, 280/30, 415.1, 47.18, 47.39
See application file for complete search history.

(56) References Cited

U.S. PATENT DOCUMENTS

| 1,282,433 | A | * | 10/1918 | Kinnard | 280/7.17 |
| 1,347,384 | A | * | 7/1920 | Kinnard | 280/7.1 |
| 1,444,295 | A | * | 2/1923 | Wynne | 280/7.1 |
| 1,838,877 | A | * | 12/1931 | Stevens | 280/7.1 |
| 2,798,727 | A | | 7/1957 | Jensen et al. | |
| 3,352,570 | A | * | 11/1967 | Cordrey | 280/282 |
| 4,079,957 | A | * | 3/1978 | Blease | 280/278 |
| 4,274,647 | A | * | 6/1981 | Drake, Jr. | 280/87.042 |
| 4,546,991 | A | * | 10/1985 | Allen et al. | 280/282 |
| 4,657,270 | A | * | 4/1987 | Allen et al. | 280/7.1 |
| 4,691,930 | A | * | 9/1987 | Samuel | 280/7.1 |
| 4,828,284 | A | * | 5/1989 | Sandgren | 280/221 |
| 4,863,182 | A | * | 9/1989 | Chern | 280/266 |
| 4,895,379 | A | * | 1/1990 | Kelly | 280/7.1 |
| 4,958,842 | A | * | 9/1990 | Chang | 280/7.1 |
| 6,089,586 | A | * | 7/2000 | Rudell et al. | 280/282 |

(Continued)

FOREIGN PATENT DOCUMENTS

GB           2210592 A  *  6/1989

*Primary Examiner* — Hau Phan
*Assistant Examiner* — Jacob Meyer
(74) *Attorney, Agent, or Firm* — Jordan IP Law, LLC; Todd A. Vaughn

(57) ABSTRACT

A toy vehicle is adaptable for use as a ride-on vehicle or a scooter, and includes a support frame provided with a user supporting mechanism and having a first portion and a second distal portion, and a grip handlebar for the user mechanically connected to the support frame. The support frame is mechanically connectible/disconnectible to/from the grip handlebar in order to assume first and second use configurations such that the grip handlebar is connected to the first and second portions, respectively, and such that the user support mechanism assumes different positions.

17 Claims, 10 Drawing Sheets

U.S. PATENT DOCUMENTS

| | | | |
|---|---|---|---|
| 6,161,847 A * | 12/2000 | Howell et al. | 280/30 |
| 6,666,470 B2 * | 12/2003 | Li | 280/282 |
| 6,685,207 B1 * | 2/2004 | Blake | 280/282 |
| 7,055,841 B2 | 6/2006 | Buhrman | 280/263 |
| D524,699 S * | 7/2006 | Kurth et al. | D12/112 |
| 7,188,849 B2 * | 3/2007 | Lee | 280/87.021 |
| 7,455,308 B2 * | 11/2008 | Michelau et al. | 280/282 |
| 7,487,982 B2 * | 2/2009 | Chan | 280/87.01 |
| 7,540,517 B2 * | 6/2009 | Wernli | 280/278 |
| D630,158 S * | 1/2011 | Jessie, Jr. | D12/423 |
| D631,102 S * | 1/2011 | Jessie, Jr. | D21/424 |
| 8,262,114 B2 * | 9/2012 | Jessie, Jr. | 280/279 |
| 2006/0082097 A1 * | 4/2006 | Michelau et al. | 280/282 |

* cited by examiner

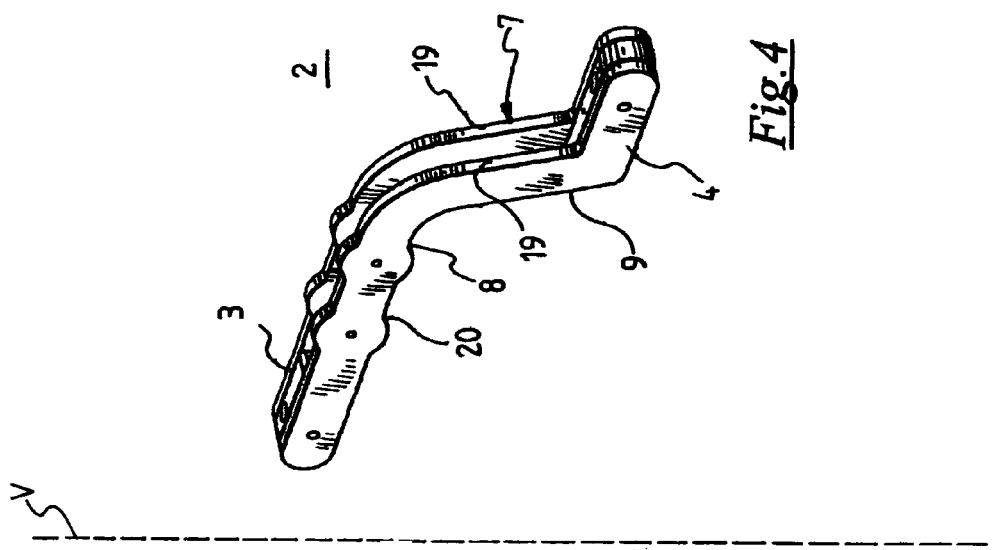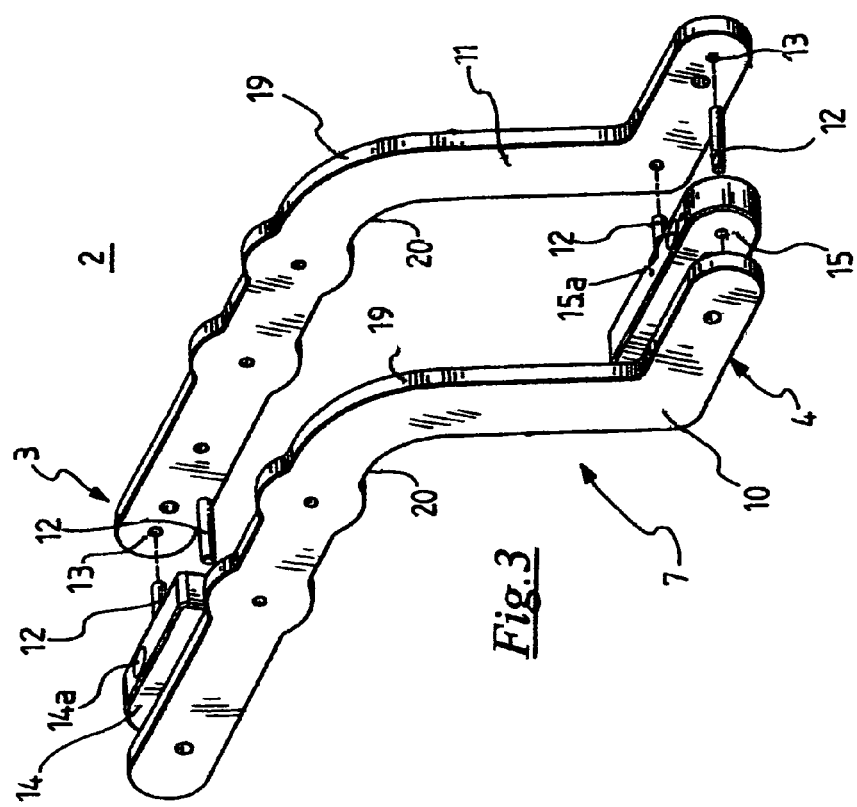

TOY VEHICLE CONVERTIBLE BETWEEN TWO USE CONFIGURATIONS

CROSS REFERENCE TO PRIOR APPLICATIONS

The present application is a National Stage Application of PCT International Application No. PCT/IT2009/000013 (filed on Jan. 15, 2009), under 35 U.S.C. 371, which claims priority to Italian Patent Application No. MI2008A000070 (filed on Jan. 18, 2008), which are each hereby incorporated by reference in their respective entireties.

FIELD OF THE INVENTION

The present invention refers to toys and, particularly, to those toys which act as vehicles.

BACKGROUND OF THE INVENTION

"Ridable"-type toy vehicles are known, such as, for example, tricycles, provided with a support frame, saddle and a certain number of wheels, typically three or four. This kind of vehicle is ridable by the child who, due to the fact that he is in a sitting position, can employ them also in his early years, for example between two and six years of age.

Moreover, toy vehicles, usable as a scooter, are known. Such a second type of vehicle is normally employed by older children than the average child who employs the ridable-type vehicles, as a great sense of balance is required.

There is a need to have a toy vehicle, that can have multiple uses and therefore can be converted from one configuration to another (e.g. from ridable to scooter) and vice-versa, avoiding the purchase of two different toys during child's growth.

Therefore, it is the aim of the present invention to provide a toy vehicle, which can be converted from one usage configuration to another, according to not extremely complicated modes.

SUMMARY OF THE INVENTION

This object is achieved by a vehicle as defined in accordance with embodiments set forth herein. The object is also achieved by a method to convert a vehicle from a first use mode into a second use mode, as defined in accordance with embodiments.

BRIEF DESCRIPTION OF THE DRAWINGS

A particular embodiment of the invention is described in detail below, as a way of example and not limitative, with reference to the accompanying drawings, wherein:

FIGS. 3 and 4 show an exploded view and an assembled view, respectively, of a support frame employable in said vehicle;

DETAILED DESCRIPTION OF THE INVENTION

Figure 1:
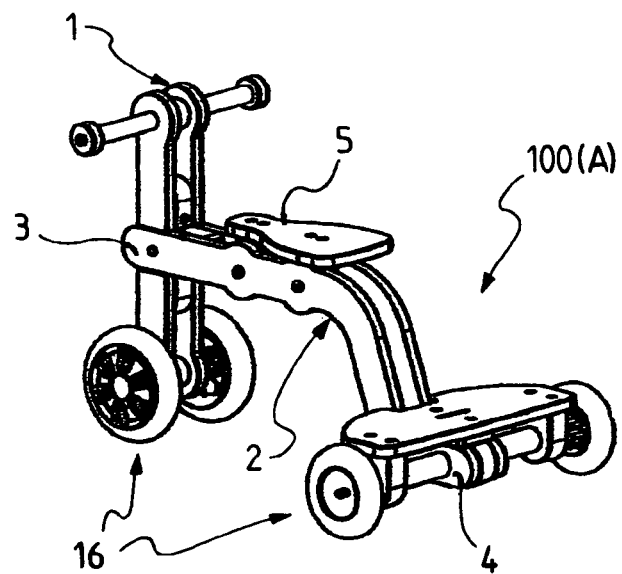
FIG. 1 illustrates an example of the vehicle according to the invention in a ridable-type configuration.
Figure 2:
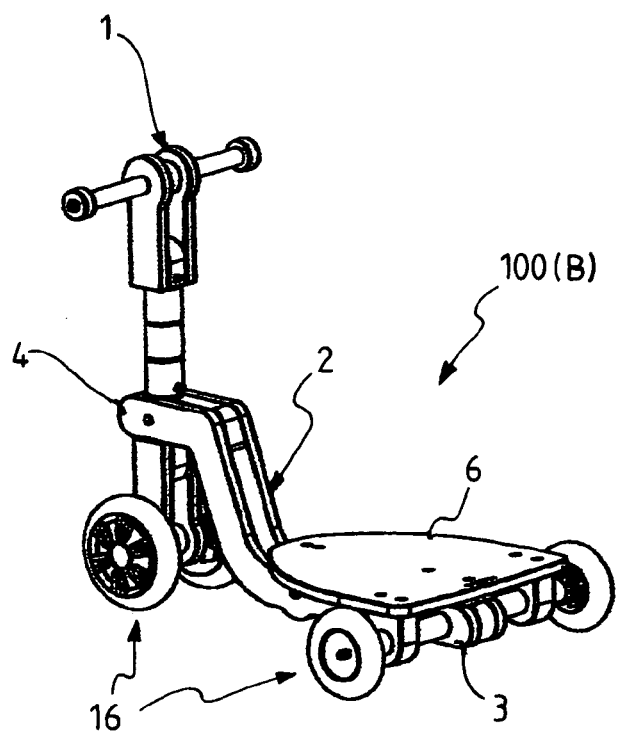
FIG. 2 shows the vehicle of FIG. 1 assembled in a scooter-type configuration.
Figure 10:
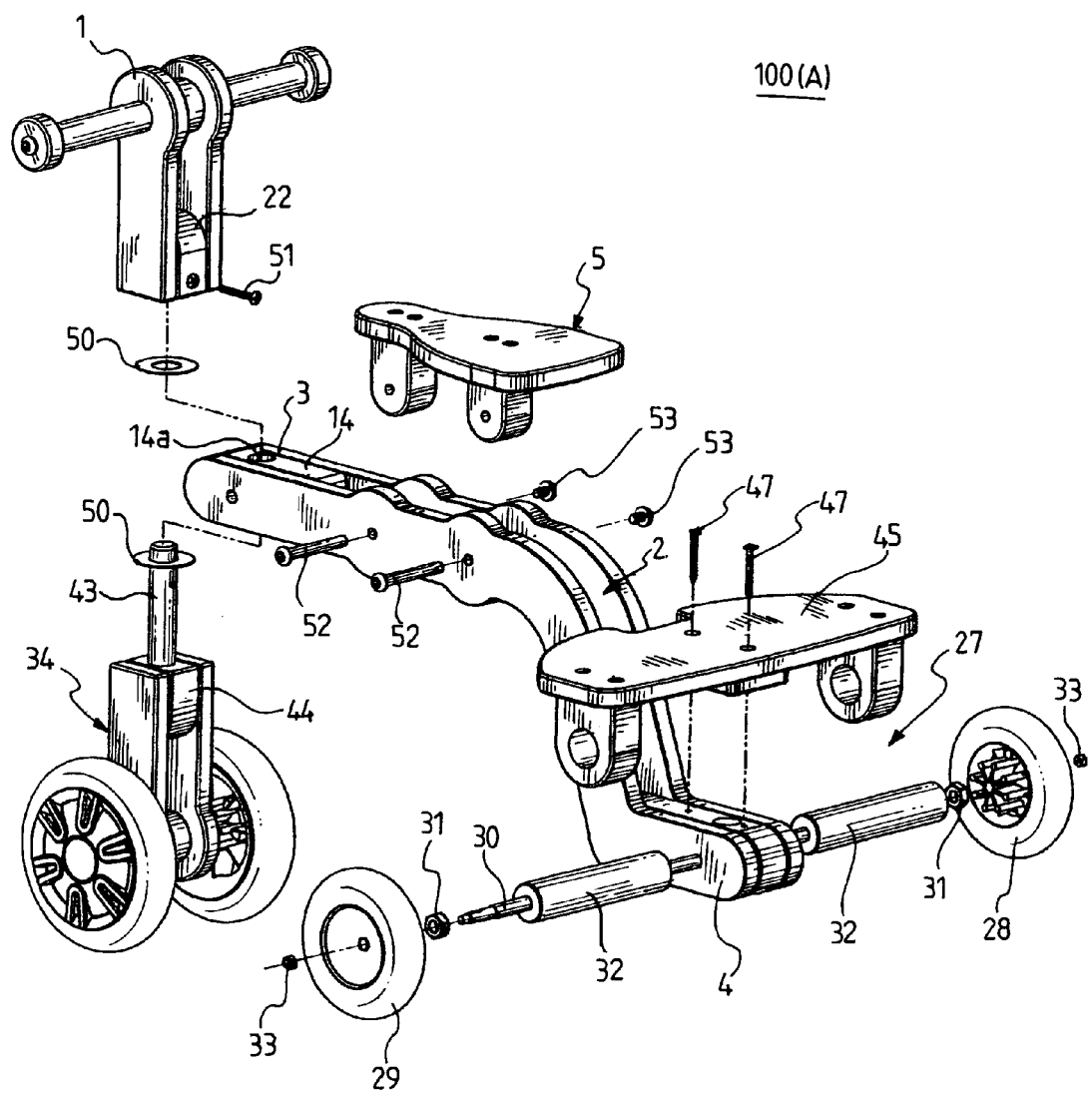
FIG. 10 illustrates an exploded view of said vehicle in the ridable-type configuration.
Figure 13:
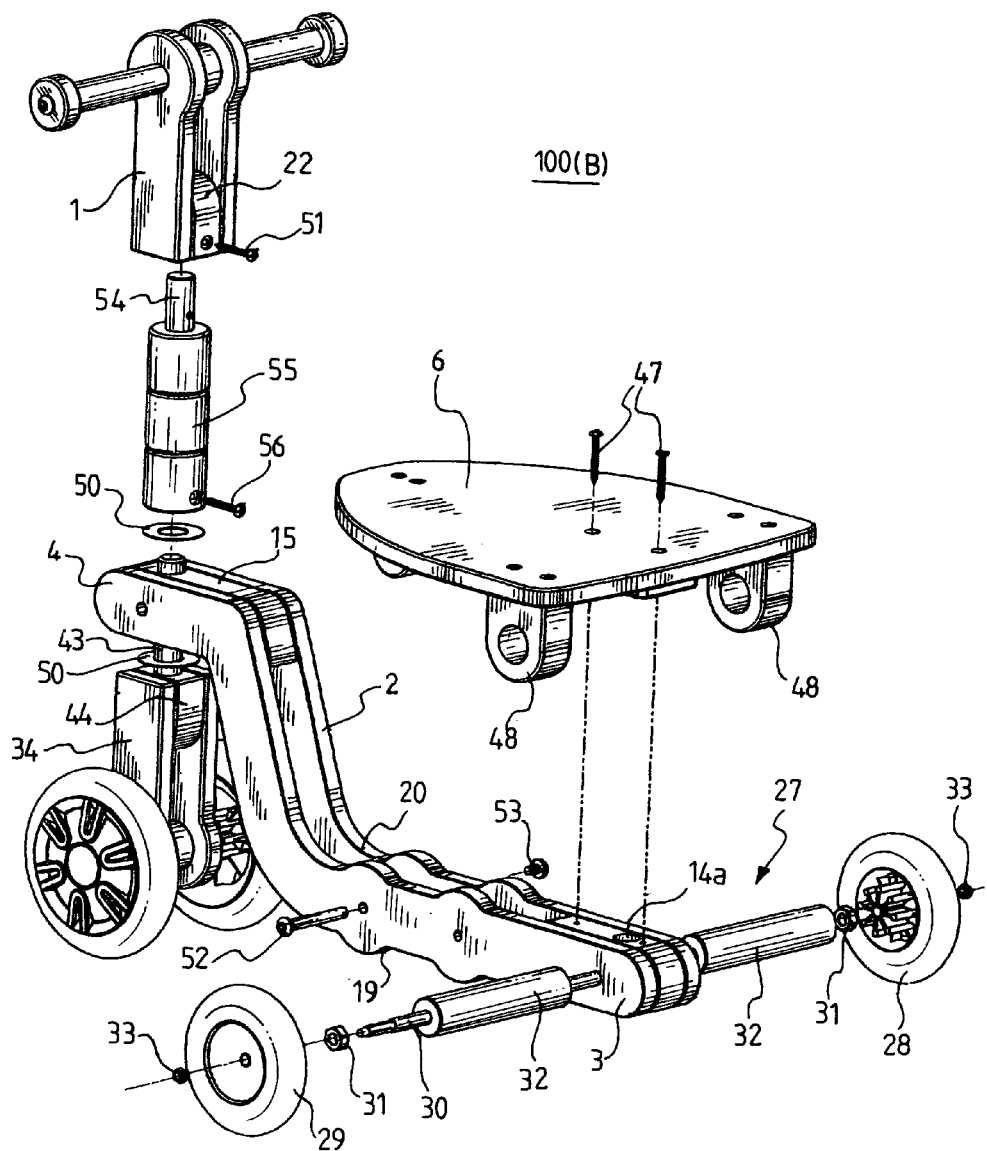
FIG. 13 illustrates an exploded view of said vehicle in the scooter-type configuration.

Referring to FIG. 1, a toy vehicle 100 in a first assembling and usage configuration (A), where it is in the ride-on or ridable-type, is shown. FIG. 2 shows the vehicle 100 in a second assembling and usage configuration (B), where the usage can be in the "scooter"-type. FIGS. 10 and 13 show exploded views of the vehicle 100 in the two configurations A and B.

Referring to both the assembling configurations A and B, the vehicle 100 comprises a grip handlebar 1 for a user and a support frame 2. The support frame 2 is provided with a first portion 3 and a second portion 4 spaced therebetween, along a vertical direction to a travelling surface of the vehicle 100.

In both assembling configurations, the support frame is provided with user supporting means. Such supporting means are realized, for example, in a seat-type support base or saddle 5 (in configuration A) and in a footrest 6 for resting one or both user feet (in configuration B). According to a preferred embodiment, both the seat base 5 and the footrest 6 are fixable to the first portion 3 of frame 2.

It is to be noted that the support frame 2 is mechanically disconnectible from the grip handlebar 1, to be re-connected to the grip handlebar 1 in another mode, in order to convert the vehicle from configuration A to B and vice-versa. In configuration A, the grip handlebar 1 is connected to the first portion 3, and in the configuration B it is connected to the second portion 4. This way, the supporting means 5 or 6 can assume different positions.

Moreover, the vehicle 100, in the two configurations A and B is provided with travelling means 16 which enable to move the vehicle on a surface. For example, such travelling means, which will be described in detail below, comprises one or more wheels or they are such that they enable a vehicle 100 movement.

Refer now to FIG. 3, where an example of the particular frame 2 in an exploded view is shown in more detail, and FIG. 4, where the same frame 2 is shown assembled. In FIGS. 3 and 4, the supporting frame 2 is oriented similar to how it is mounted in configuration A (FIG. 1).

As can be seen in FIG. 4, the support frame 2 defines longitudinally a broken line comprising a first portion 3, a central portion 7 and a second portion 4. In particular, the central portion 7 has a first end 8 connected to the first portion 3 and an opposite second end connected to the second portion 4. The central portion 7 appears inclined relative to the first and the second portions 3 and 4, which are substantially parallel to each other.

Moreover, the first and the second portions 3 and 4 are spaced along a direction V, vertical relative to a travelling surface of vehicle 100. Hence, in the two configurations A and B, portion 3 is higher or lower than portion 4.

The support frame 2 of FIG. 3, comprises a left lateral carrying element 10 facing a right lateral carrying element 11, which is symmetrical to the left one. The left and right carrying elements 10 and 11 can be made, for example, of wood and are fixable to each other by pegs 12 (also made of wood, for example) which insert into corresponding holes 13.

Between the lateral bearing elements 10 and 11 and in the first portion 3, a first hinge block 14 is located, having, for example, a box shape, fixed by respective pegs 12 and apt to enable the mechanical connection with the handlebar 1 and the travelling means 16 in the configuration A. The first hinge block 14 is provided with a through-hole 14a.

Moreover, at the second portion 4, enclosed between the lateral bearing elements 10 and 11, a second hinge block 15 is located, provided with a respective hole 15a, fixed through respective pegs 12 and apt to enable the mechanical connection with the handlebar 1 and with the travelling means 16 in configuration B.

The lateral carrying elements 10 and 11 are provided with a respective first edge wall 19 (well visible in FIG. 3) and a respective second edge wall 20, opposite to the first, which extend longitudinally.

Figure 5:
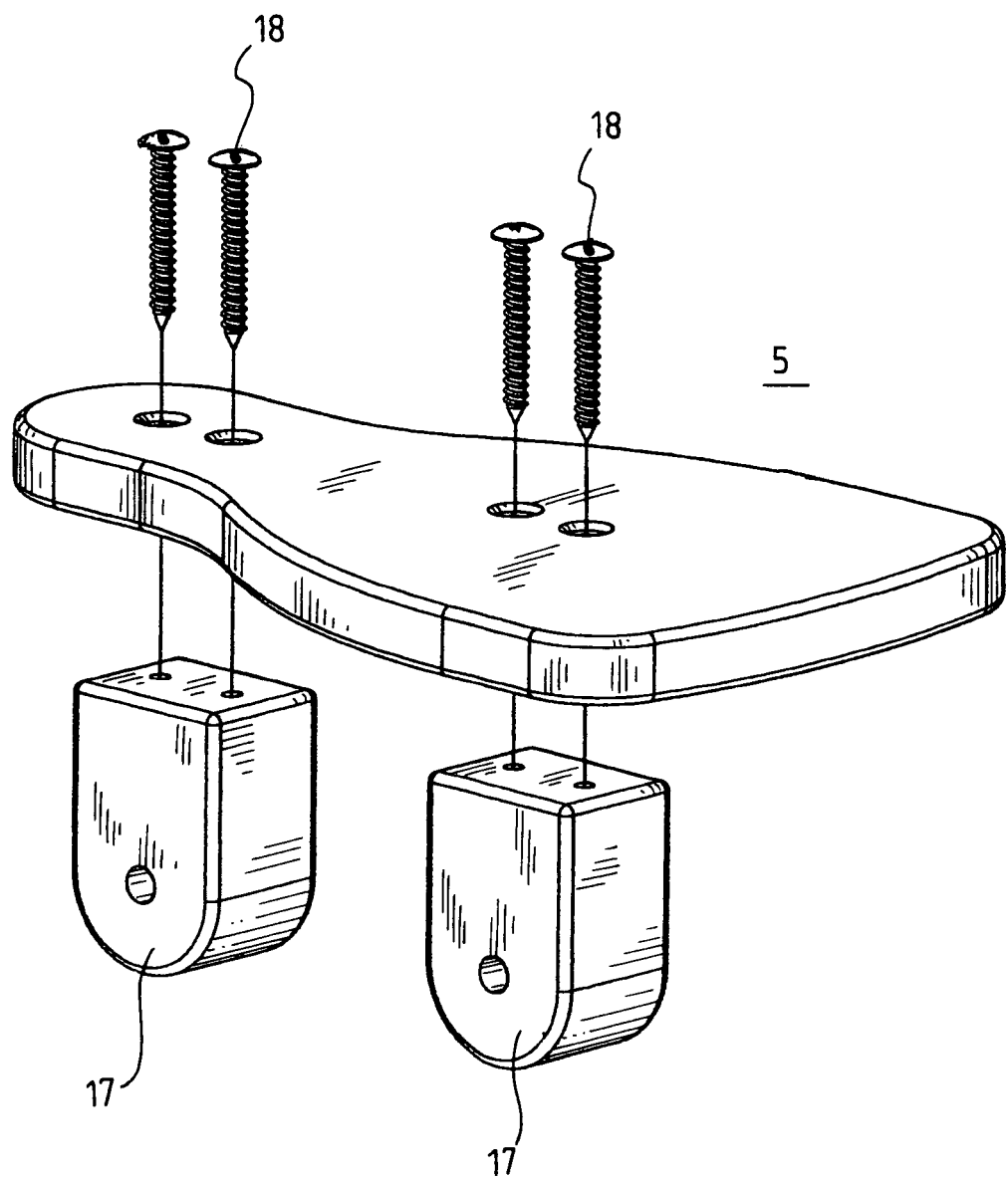
FIG. 5 shows an example of saddle employable in the ridable configuration of said vehicle.

FIG. 5 shows in more detail a particular example of the bearing base or saddle 5, which presents an ergonomic shape and is provided with lateral brackets 17 for fixing to the support frame 2 through, for example, relative pegs 12 (FIG. 1) or other suitable fixing means. The lateral brackets 17 are, in turn, fixable to the saddle 5, through proper means such as, for example, screws 18. It is to be noted that the saddle 5 is reversibly fixable to the support frame 2.

As it can be seen in FIG. 1, the saddle 5 is mounted, in configuration A, to the support frame 2, in order to face its first edge walls 19 and 20 (FIG. 3).

Figure 6:
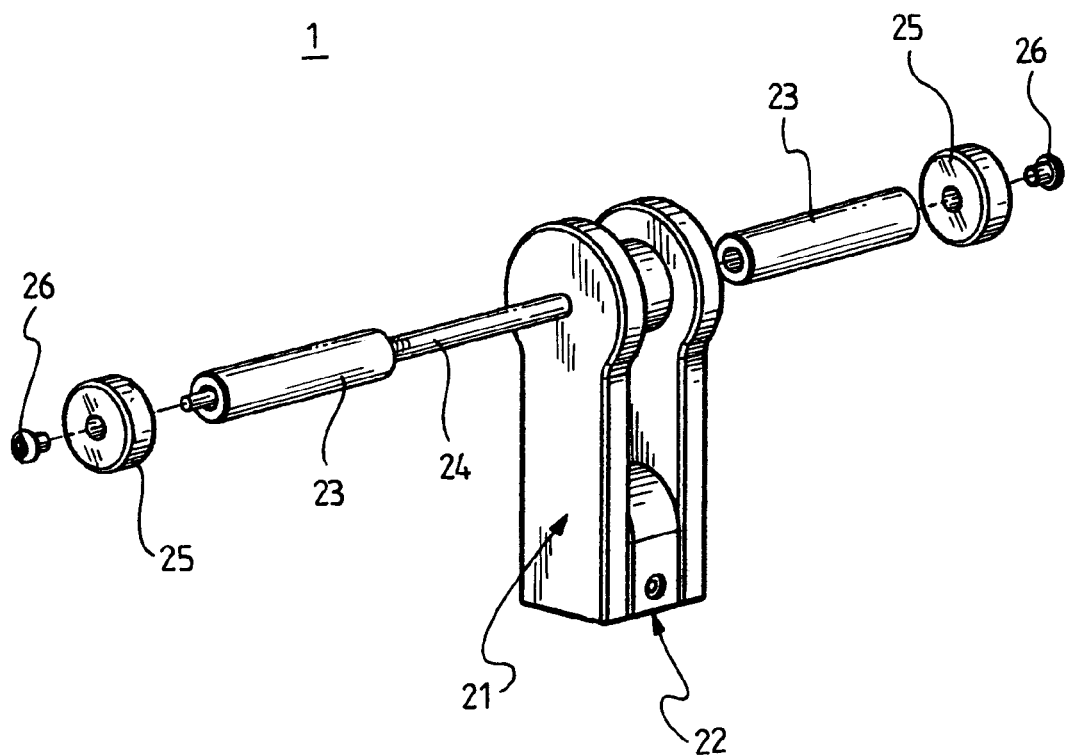
FIG. 6 shows an example of a grip handlebar employable in said vehicle.

Refer now to FIG. 6, where a particular embodiment of a grip handlebar 1 is shown, comprising, a fork 21 (or any other suitable connecting device), a first engagement element 22, two sleeved grips 23 fit on a rod 24, which orthogonally traverses an upper region of fork 21. Preferably, lateral knobs 25 are fixed to the ends of bar 24 through screws 26.

Figure 7:
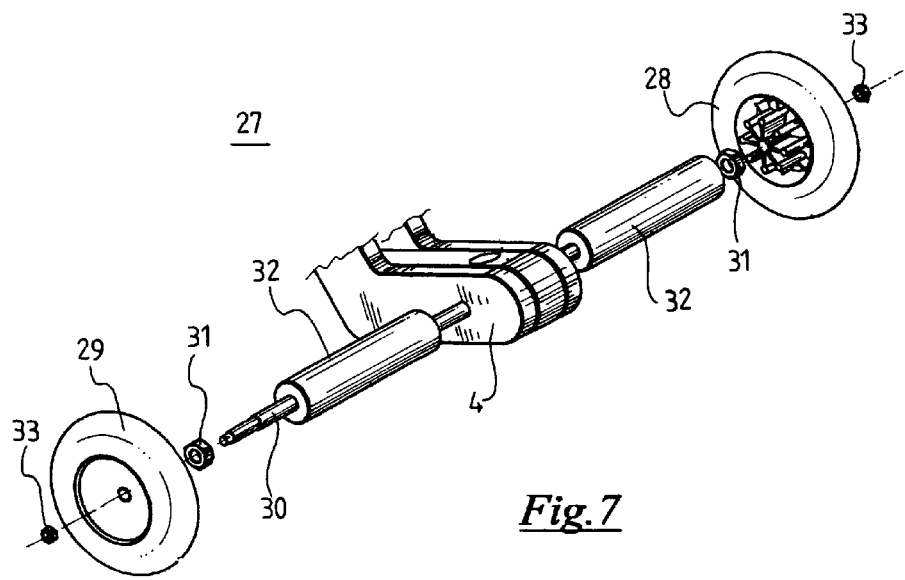
FIGS. 7 and 8 show an example of a rear wheel set and a front wheel set, respectively, employable in said vehicle.
Figure 8:
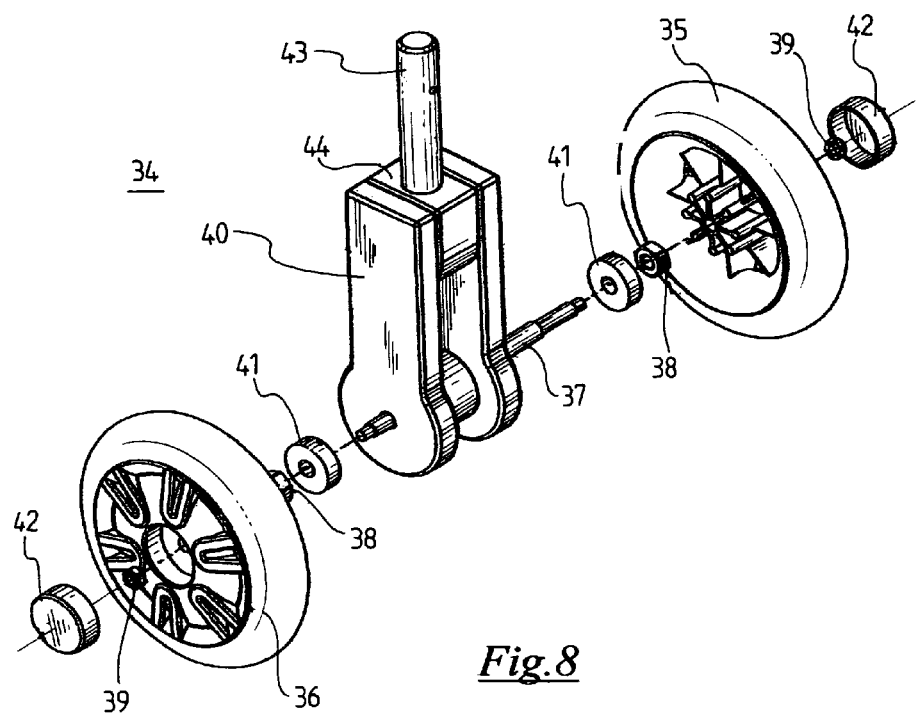

Examples of travelling means employable in vehicle 10 according to the invention are shown with reference to FIGS. 7 and 8. FIG. 7 refers to a rear travelling set 27 which comprises a right rear wheel 28 and a left rear wheel 29 to be disposed on opposite sides relative to the support frame 2. The rear wheels 28 and 27 are mounted on a respective rotation rod 30 (for example, with threaded ends) and fixed by inner nuts 31, which bear on respective connectors 32, and external nuts 33. In the example in FIG. 7, the wheels 28 and 29 are mounted on the second portion 4 according to configuration A of vehicle 100.

FIG. 8 shows an example of embodiment of a front wheel set 34 comprising a front right wheel 35 and a front left wheel 36 mounted on the further rotation rod 37 and fixed through further inner nuts 38 and further external nuts 39. Moreover, the front wheel set 34 is provided with a respective fork 40 (or any other suitable connecting device) traversed in a lower region by the further rotation rod 37. Among the further inner nuts 38 and a respective wall of fork 40 spacer rings 41 are inserted. Moreover, the additional external nuts 39 can be conveniently covered by protective cups 42 (made, for example, of plastic).

The further fork 40 is provided with a first movement transmitting pin or bar 43, which extends vertically and is, below, integral with a second engagement element 44.

Figure 9:
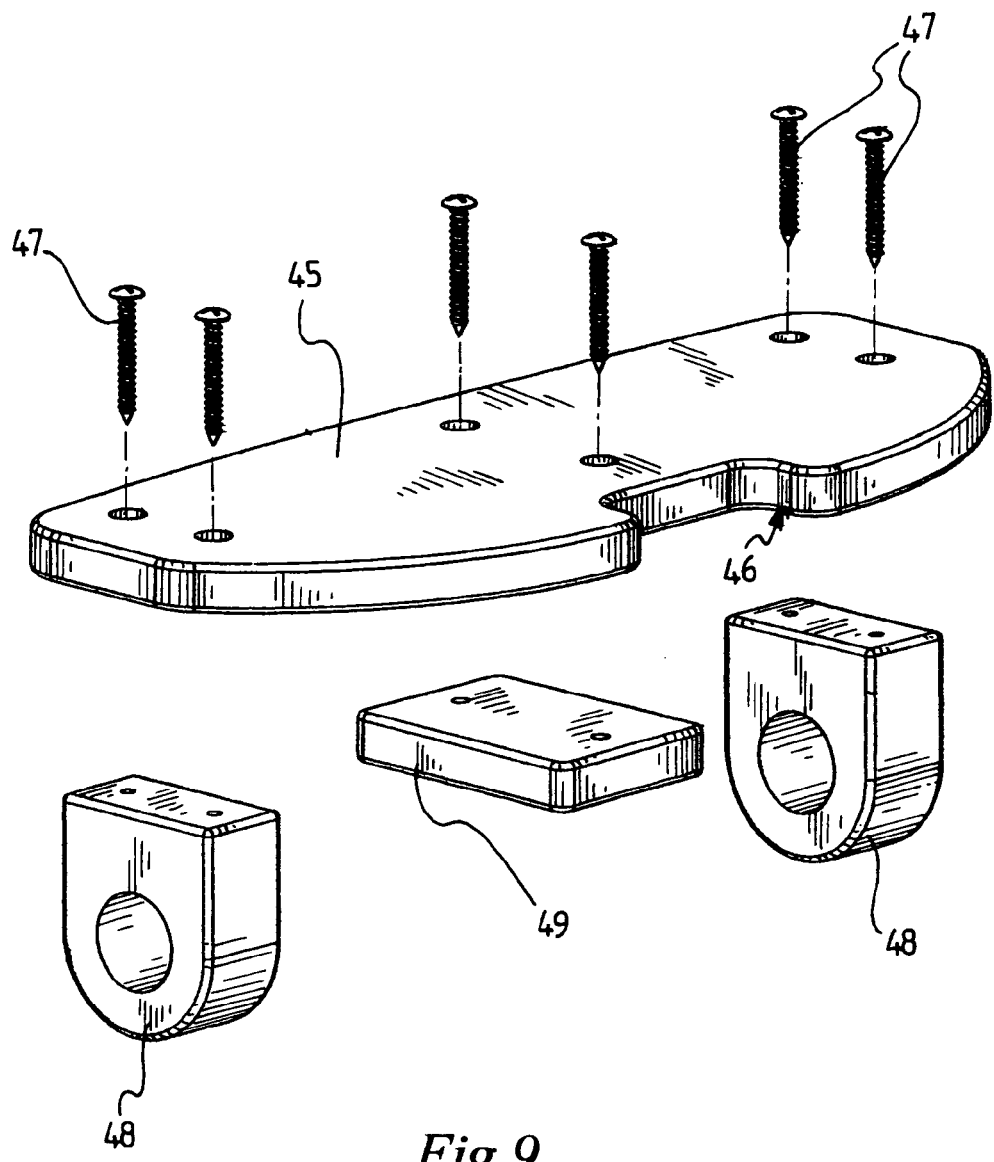
FIG. 9 shows an example of a rear support plane employable, according to an exemplary embodiment, in the ridable-type configuration.

Preferably, vehicle 100, for example, in configuration A, can be also provided with a first rear support plate 45, illustratively shown in FIG. 9 and in FIG. 1 and provided with a cut-out 46 apt to receive part of the central element 7 of frame 2. A cording to the illustrated example, the support plate 45 is fixable, through respective screws 47, to two lateral fixing bodies 48 provided with holes for the passage of connectors 32 (FIG. 7) of the rear wheel set 27. A spacer 49 can be interposed between a lower face of the support base 45 and the second portion 4 of frame 2.

In relation to the vehicle 100 assembly in configuration A, reference is also made to FIG. 10. The support frame 2 is disposed such that the first portion 3 is at a higher height from the floor and, in the example, in a front position, whereas the second portion 4 is lower and in the back. The front wheel set 34 is assembled and the first movement transmission pin 43 is inserted in the through-hole 14a of the first hinge block 14. The assembled handlebar 1 is mounted such that the upper end of the first movement transmission pin 43 is accommodated in a suitable cavity of the first engagement element 22. Two washers 50 (for example, made of plastic) can be advantageously inserted on the first movement trans-mission pin 43, which is made integral with the handlebar 1 through a screw 51 insertable through a threaded bore of the first engagement element 22. A rotation of handlebar 1 relative to the frame 2 causes a correspondent rotation of the front wheel set 34, which enables to modify the travelling direction of vehicle 100.

The rear support plate 45 and the rear wheel set 27 are mounted to the second portion 4 of the support frame 2, as shown in FIG. 10, in order to allow the rotation of wheels 28 and 29. Mounting the saddle 5 can be achieved by bolt means comprising screws 52 and nuts or back-screws 53.

Figure 11:
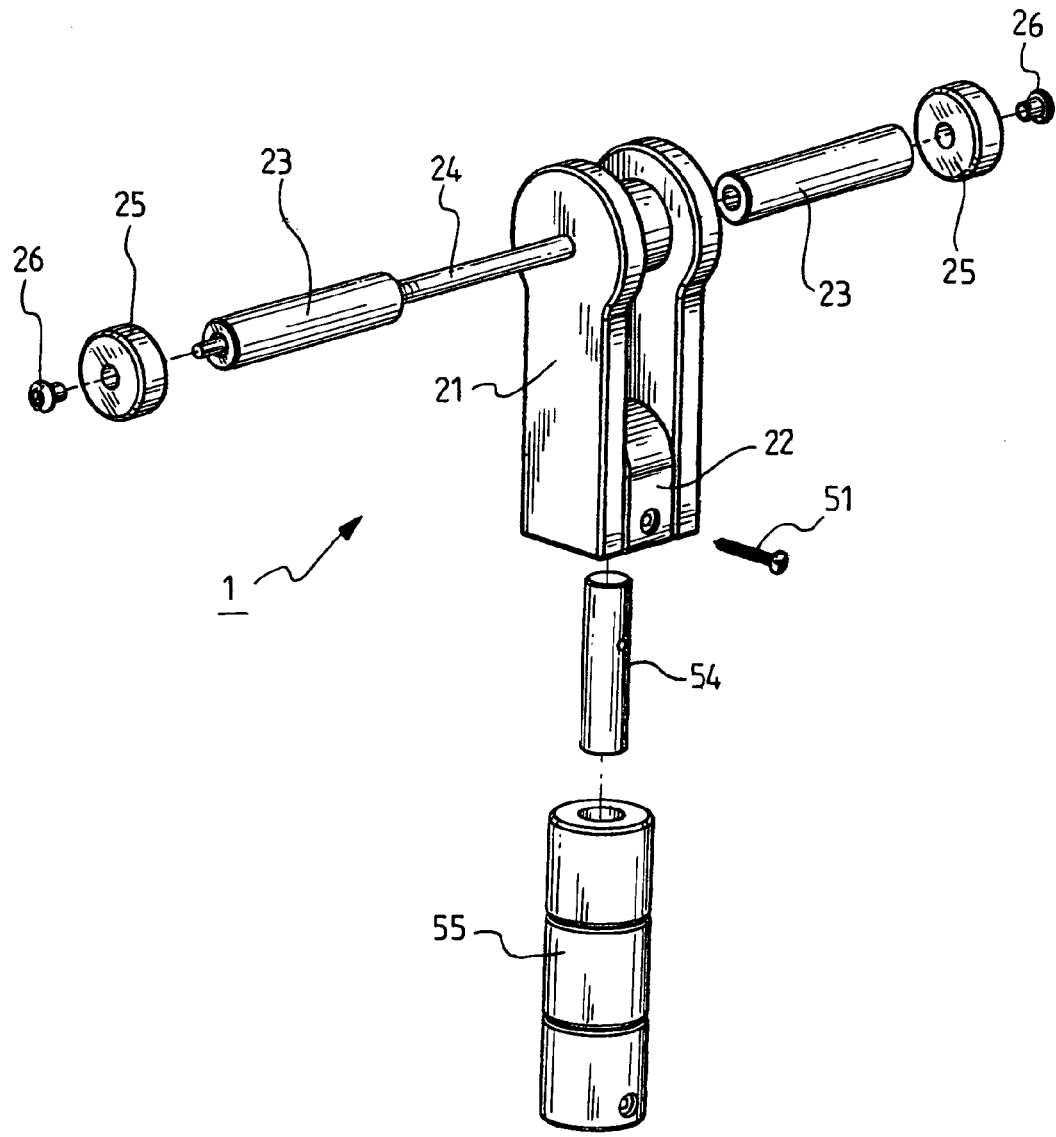
FIG. 11 shows a grip handlebar employable in said vehicle in the scooter-type configuration.

In the following, referring to FIGS. 11, 12 and 13, some components will be described, for example, employed to mount the vehicle 100 in configuration B (FIG. 2). In particular, FIG. 11 shows a handlebar 1 comprising the same elements described with reference to FIG. 6 and the following additional components: a second pin 54 and a vertical extension hollow rod 55.

An end of second pin 54 is insertable in the cavity of the first engagement element 22 and it is fixable to this through the above-mentioned screw 51 (FIG. 13). Moreover, another end of the second pin 54 is internally insertable to the extension rod 55 and it is fixable thereto through an further screw 56 (shown in FIG. 13) which traverses the rod 55 itself.

Figure 12:
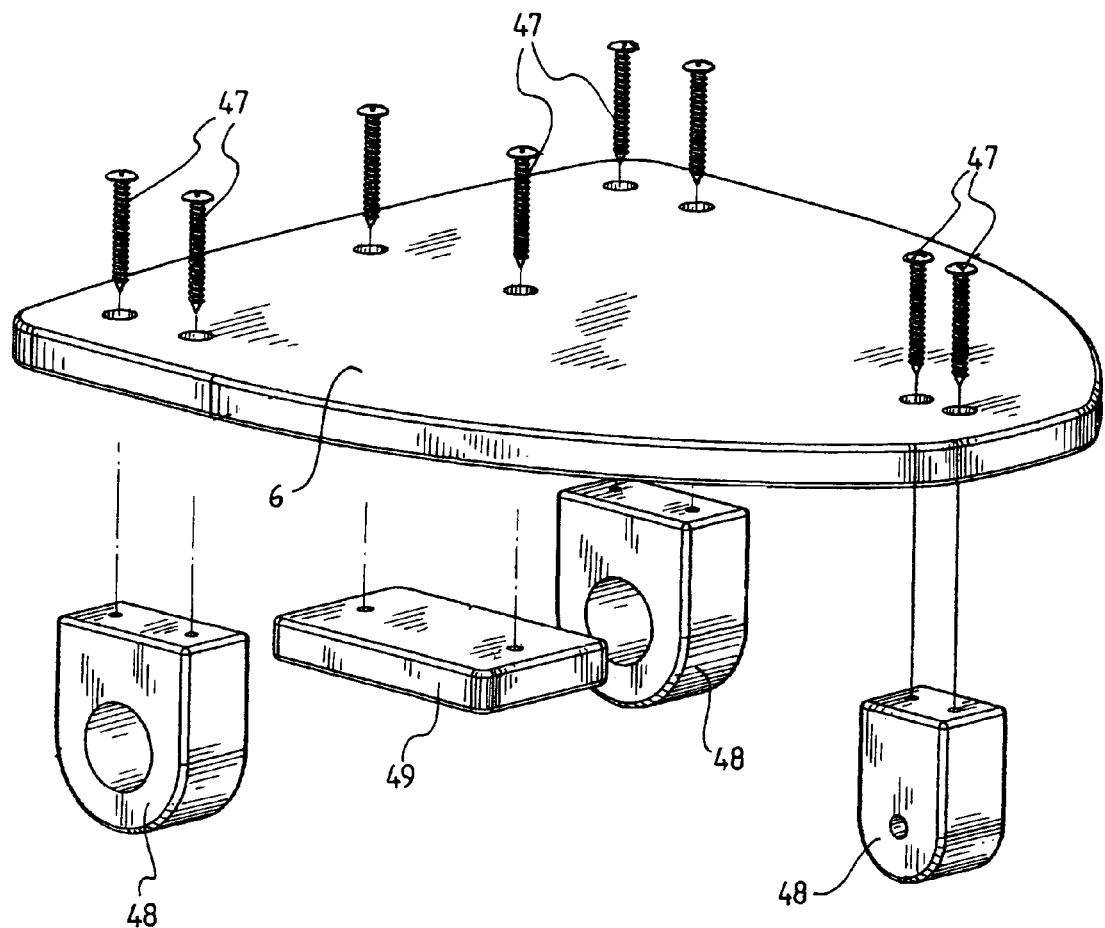
FIG. 12 shows an exemplary footrest employable in the scooter-type configuration.

FIG. 12 shows in more detail the footrest 6, provided with screws 47, fixing brackets 48 and spacer 49, fixable to the second portion 4 of support frame 2.

Relative to the conversion operations from configuration A (ridable) to B (scooter-type), it is to be considered that the disassembling of vehicle 100 from configuration A is easily feasible, as it is evident from FIG. 10.

For mounting the vehicle 100 in configuration B, the support frame is rotated by 180° in respect to configuration A, so that the first portion 3 can assume the orientation of FIG. 13, being, therefore, disposed in the back and lower in respect to the second portion 4.

In the mounting, the upper end of the first pin 43 is inserted from the bottom in the hole 15a of the second hinge block 15 of the second portion 4, and therefore in the cavity of the vertical extension rod 55 to be fixed thereto by a screw 56. The first pin 54, fixed on the top to the first engagement element 22, is made integral, in its lower end, with the vertical extension rod 55 through, preferably, glue.

The footrest 6 and the rear wheel set 27 are mounted to the first portion 3, similarly to the mounting of the rear support plate 45 and of the rear wheel set itself, in configuration A. It is to be observed that a lower face of the footrest 6 faces the second edge walls 20 of the support frame 2. According to this example, the saddle 5 and the rear support plate 45 are not employed in configuration B, but it is possible to provide that at least one of these two bearing bases is usable in both configurations.

Vehicle 100, according to the present invention is particularly advantageous. In fact, it can be employed by a child as a ridable toy vehicle (configuration A) until a certain age (for example six years). Subsequently, the vehicle can be disassembled and re-assembled in configuration B, in order to be used as a scooter, and the child will stand on footrest 6, gripping the handlebar 1.

Hence, the vehicle 100 can be used with different functions for different ages of children, requiring no replacement with any other toy for a wide period of its user's growth.

As it is evident from the above-described, the conversion from configuration A to B and vice-versa, is particularly easy and quick, due to the chance to orient differently the support frame 2 according to the desired use. The other modifications to vehicle 100 are easily feasible as a consequence of using fixing means of the several reversible-type components. The preferred use of wood as a material for making several components of vehicle 100 allows to put together robustness, relative lightness and environment respect.

The invention claimed is:

1. A toy vehicle comprising:
    a support frame having a first portion, a second portion spaced distally from the first portion, and user supporting means provided on the support frame;
    a grip handlebar mechanically connected to the support frame, wherein the support frame is mechanically connectible to and disconnectible from the grip handlebar in order to assume a first vehicle use mode having a first configuration and a second vehicle use mode having a second configuration,
    a front wheel set connected to one of the first portion and the second portion and to the grip handlebar, in accordance with the one of the first configuration and the second configuration;
    a rear wheel set connected to the other of the first and the second portion; and
    at least a first rotatory movement transmitting pin having a first end connected to the front wheel set and a second end reversibly connectible to the grip handlebar, the first pin being hinged to one of the first portion and the second portion of the support frame in accordance with one of the first configuration and the second configuration,
    wherein the grip handlebar is connected to the first portion and the second portion, respectively, and such that the user supporting means assumes different positions when in the first vehicle use mode and in the second vehicle use mode,
    wherein in the first configuration the vehicle permits the user to be placed in a sitting position, and in the second configuration the vehicle permits the user to be placed in a standing position,
    wherein the first portion and the second portion are spaced relative to each other along a vertical direction with respect to a travelling surface of the vehicle so that the first portion in the first configuration is higher than the second portion and in the second configuration the first portion is lower than the second portion,
    wherein in the first configuration the user supporting means is mounted at a first height and in the second configuration the user supporting means is mounted at a second height lower than the first height.

2. The toy vehicle of claim 1, wherein the user supporting means are fixed to the first portion in the first configuration and the second configuration.

3. The toy vehicle of claim 1, wherein said user supporting means comprises a first support base to be employed in the first configuration and an alternative second support base to be employed in the second configuration.

4. The toy vehicle of claim 3, wherein the first base is adapted to permit the user to sit thereon and the second base is a footrest adapted to permit at least one of the user's feet to be placed thereon.

5. The toy vehicle of claim 1, wherein the support frame longitudinally defines a broken line and comprises a central portion having an end connected to the first portion and an opposite end connected to the second portion, said central portion being inclined in respect to the first portion and the second portion, parallel to each other.

6. The toy vehicle of claim 1, wherein the support frame in the second configuration is rotated by 180° with respect to a position assumed in the first configuration.

7. The toy vehicle of claim 3, wherein the support frame defines, in the first configuration and the second configuration, an upper face and a lower face, the first base and the second base being mounted, in the respective configurations, on the corresponding upper face of the frame.

8. The toy vehicle of claim 1, further comprising one or more wheels mechanically coupled to the support frame.

9. The toy vehicle of claim 1, further comprising sliders mechanically coupled to the support frame.

10. The toy vehicle of claim 1, further comprising a vertical extension element interposable in the second configuration between the grip handlebar and the front wheel set and fixable to said second end of the first hinge pin.

11. The toy vehicle of claim 10, further comprising a second hinge pin having a lower end fixed to the vertical extension element and an upper end reversibly fixable to the grip handlebar.

12. The toy vehicle of claim 1, wherein in the first configuration, the first portion is in a forward position with respect to the second portion, and in the second configuration the first portion is disposed backward with respect to the second portion, with reference to a forward travelling direction of the vehicle.

13. The toy vehicle of claim 1, wherein the support frame is adapted to reversibly assume the first configuration and the second configuration.

14. The toy vehicle of claim 3, wherein the first support base and the second support base are each adapted to be reversibly fixed to said support frame.

15. The toy vehicle of claim 3, wherein the grip handlebar, the support frame, the first base and the second base are made of wood.

16. The toy vehicle of claim 1, wherein the first portion and the second portion are opposite ends of the support frame having a broken line shape.

17. A toy vehicle convertible between a first usage mode that permits a user to be placed in a sitting position during operation and a second usage mode that permits the user to be placed in a standing position during operation, the toy vehicle comprising:
    a support frame having a first portion and a second portion spaced distally from the first portion, the first portion being spatially higher than the second portion when the toy vehicle is in the first usage mode and spatially lower than the second portion when the toy vehicle is in the second usage mode;
    user supporting means provided on the support frame such that in the first usage mode the user supporting means is mounted at a first height and in the second usage mode the user supporting means is mounted at a second height lower than the first height;

a grip handlebar connected to the first portion when the toy vehicle is in the first usage mode and to the second portion when the toy vehicle is in the second usage mode;

a first wheel set connected to the first portion when the toy vehicle is in the first usage mode and to the second portion when the toy vehicle is in the second usage mode; and a second wheel set connected to the second portion when the toy vehicle is in the first usage mode and to the first portion when the toy vehicle is in the second usage mode, wherein in the first usage mode, the first portion is in a forward position with respect to the second portion, and in the second usage mode the first portion is disposed backward with respect to the second portion, with reference to a forward travelling direction of the toy vehicle.

\* \* \* \* \*